Nov. 23, 1965  R. I. FERSTER  3,219,071
TUBULAR SIGHT FLOW DEVICE
Filed Sept. 5, 1962
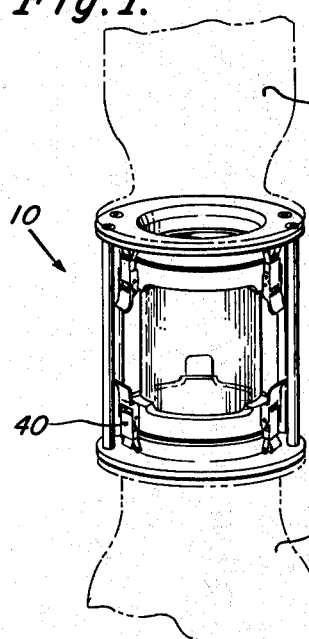
Fig. 1.
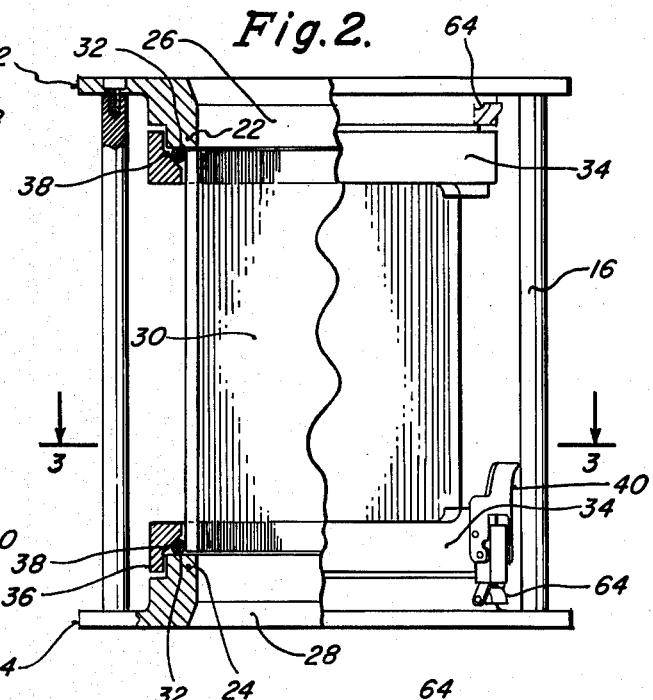
Fig. 2.
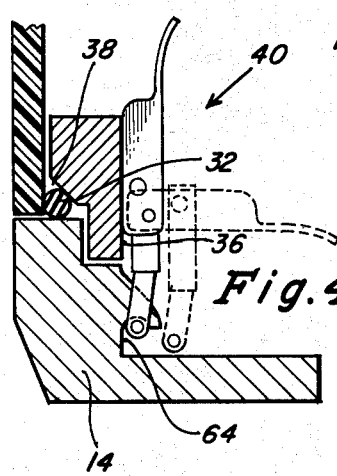
Fig. 5.
Fig. 4.
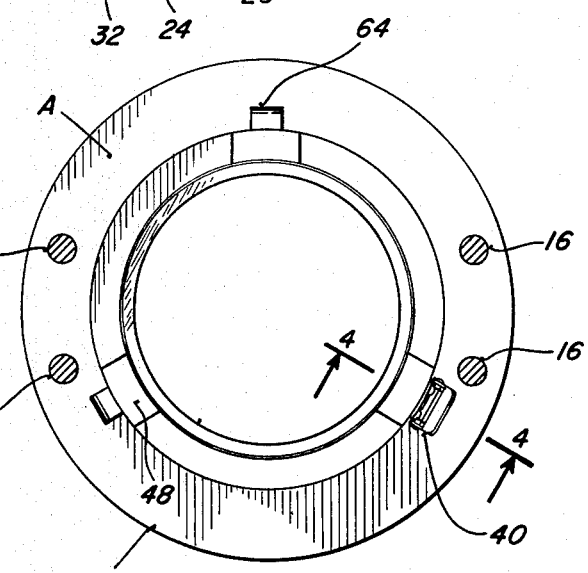
Fig. 3.
INVENTOR.
Reuben I. Ferster
BY
Whiteley and Caine
ATTORNEYS

United States Patent Office 3,219,071
Patented Nov. 23, 1965

3,219,071
TUBULAR SIGHT FLOW DEVICE
Reuben I. Ferster, Minneapolis, Minn., assignor to Machinematics, Inc., Minneapolis, Minn., a corporation of Minnesota
Filed Sept. 5, 1962, Ser. No. 221,572
1 Claim. (Cl. 141—94)

This invention relates to improvements in a tubular sight flow device for providing visual inspection of a fluid flowing through a conduit or the like. In general, the invention is concerned with providing a device in which the sight flow element can be easily and quickly removed for cleaning or replacement, and in which efficient and substantial seals are established.

In numerous applications it is often desirable to be able to have visual observation of a fluid flowing through a conduit. Where visual observation of the fluid is required, it is necessary to provide for the removal of the transparent member for cleaning and replacement. Replaceable sight glass elements are known in the prior art, but the arrangements for removal and replacement of this type of element, as taught by the prior art, is cumbersome and time consuming, and often results in damage to the transparent member. These criticisms of prior art will become more apparent as the size or diameter of the duct and the transparent element are increased. Thus, in a duct of substantial diameter, threaded couplings or connections used in the prior art cannot be easily joined, and other known sealing means become ineffective.

In the present invention, I have provided a sight flow device which may be used in ducts of relatively large diameter, wherein the transparent element can be quickly removed and replaced, and wherein a substantial seal can be obtained between the transparent element and the coacting metal parts without danger of breakage or damage to the transparent element. My invention provides quick release clamping means that coact with elements that telescopically circumscribe the transparent tube, and the telescopic elements are provided with beveled or inclined surfaces that coact with suitable resilient gaskets to produce a wedging action about the periphery of the tube at the junction of the transparent tube with the coacting parts, to provide a highly efficient type of seal.

An object of the invention is to provide a sight flow device in which a transparent tubular sight flow element can be quickly replaced, and in which a highly efficient seal is obtained between the coacting parts.

Other and further objects may become apparent from the following specification and claim, and in the appended drawing in which:

FIG. 1 is a perspective view of the sight flow device forming the present invention;

FIG. 2 is a side elevation of the sight flow assembly with parts broken away and others shown in section;

FIG. 3 is a plan view taken on the lines 3—3 of FIG. 2;

FIG. 4 is a sectional detail view of a part of the structure shown in FIG. 2; and FIG. 5 is a detail view of a clamping mechanism shown in other figures.

Referring now to the several views of the drawing, the invention will be described in detail.

General reference numeral 10 indicates in its entirety the sight flow device forming the present invention. A pair of headpieces 12 and 14 are held in rigidly spaced relationship with each other by a series of connecting rods 16. Headpieces 12 and 14 are in the nature of circular flanges that have flat outer faces for connection to other devices, such as a supply container 18 and a receiving container 20, shown in dotted lines in FIG. 1. The inner or adjacent faces of the headpieces 12 and 14 are provided with annular inwardly projecting shoulders 22 and 24. The inner edges of the shoulders 22 and 24 define the outer limits of circular openings 26 and 28 in the headpieces 12 and 14. A cylindrical tubular transparent member 30 is disposed between the adjacent surfaces of the headpieces 12 and 14, and it will be normally disposed between said parts by lateral disposition through the areas indicated at A or B. The opposite ends of member 30 are substantially in contact with the shoulder portions 22, 24, of the headpieces so that material flowing therethrough will, to all practical extent, only come into contact with the metal surfaces 26 and 28, and the interior surface of the transparent member 30.

Circumscribing the transparent member 30, and disposed at opposite ends thereof are a pair of resilient gaskets 32 which are disclosed as being generally circular in cross section, although as discussed hereinafter, these gaskets 32 might be of other configuration, provided they perform the desired function.

Circumscribing the transparent member 30, and telescopically movable in a longitudinal direction therewith, are a pair of annular metallic members 34, each of which is provided with an annular shoulder portion 36 that circumscribes the shoulders 22 and 24 of the headpieces 12 and 14. A part of the interior surface of the annular telescopic members 34 is chamfered, or beveled, at 38 to angularly engage the gaskets 32 for a purpose which will be discussed later herein.

It will be noted that the members 34 do not directly contact the interior surfaces of the headpieces 12 and 14, but merely serve as means for positioning and sealing the gaskets 32 with respect to the periphery of member 30 in relation to the headpieces 12 and 14.

Clamping means are provided to produce a quick clamping action between the members 34 and the headpieces 12 and 14, and one form of such clamping means is indicated by the general reference numeral 40 disclosed in FIGS. 4 and 5. A plate 42 having a pair of outwardly projecting ears 44 is secured by screws 46 to upwardly projecting lugs 48 of each of the angular telescoping members 34. A hand piece 50 is pivotally connected to the ears 44 by rivets 52. Extending between opposite ears 54 of the hand piece 50 is a connecting rod 56 on which is pivotally mounted a member 58 having at its opposite lateral extremities a pair of arms 60, the outer ends of which are joined by a connecting pin 62. The hand piece 50 is rotatable on its connection 52 with the member 42, and the member 58 has a pivotal connection through the rod 56 with the hand piece 50. The outer end rod 62 projecting from the arms 60 is adapted to engage in a slotted portion 64 in the respective headpieces 12 and 14 so that by a pivotal movement disclosed in dotted lines and full lines of FIG. 4, the clamping members 40 may be individually actuated to lock the annular members 34 with respect to the headpieces 12 and 14 to force the chamfered or beveled surfaces 38 against the gaskets 32.

In operation, the headpieces 12 and 14 are joined by connection to other parts of the system or apparatus, such as the elements 18 and 20 by conventional fastening means, such as flange bolts that have been omitted from the disclosure. The headpieces 12 and 14, and their connecting rods 16 therefore become a part of the main apparatus, such as a filling machine for loading flowing fluid, such as flour, into containers. The fluid will, in general, only contact the interior surfaces of the headpieces, and the interior of the transparent member 30, and these parts, when necessary, can be easily cleaned by the removal of the transparent member 30. This is accomplished by moving the several clamping members 40 to the dotted line position of FIG. 4, where the elements 62 are removed from the slots 64, whence the annular members 34 may be telescoped inwardly towards the center of member 30, and the assembly removed from the headpieces by the lateral movement through the spaces A or B, disclosed in FIG. 3, between the connetcing rods 16. To replace a member 30, the telescoping members 34 are placed in circumscribing relationship thereto, and the annular gaskets 32 are placed about the ends of the tube, whence the assembly is reinserted through space A or B, and the telescoping members are moved in their respective directions and clamped in place by the clamping members 40. It will be observed in FIG. 4 that the cross sectional dimension of the gasket 32 is such that when member 40 is in the clamped position, member 34 is held in spaced relation to the headpiece 14, and the gasket 32 has been wedged by the beveled surface 38 into a tight sealing relationship between the annular shoulder 24 and the end of the transparent member 30. While the systems with which this sight flow member are normally intended to be used may be frequently operated at barometric pressure, they are likewise frequently operated at a pressure less than barometric, so that the external air pressure will be exerted against the resilient gaskets 32, and this pressure merely aids in providing a better seal, since the clamping mechanisms 40 exert a continuing pressure against the gasket by virtue of the beveled or chamfered surface 38. Similarly, if there is an internal pressure within the system, such pressure is likewise exerted at the junction between the ends of the tube and the headpieces, and by virtue of the resilient nature of the gaskets 32, the seal at the junction is improved.

The principal advantage of this invention is in the provision of a cylindrical sight flow device wherein the transparent member may be easily removed for cleaning and/or replacement, and since the annular telescoping members do not directly engage the headpieces, but are urged against the resilient gaskets by the over-center clamping means, an excellent seal is furnished at the junction of the several parts.

My invention is defined in the terms of the appended claim.

I claim:

A sight flow device, comprising a pair of headpieces rigidly connected in spaced relationship with each other, each of said headpieces on their adjacent sides formed with an annular shoulder projecting in the direction of the other headpiece and forming the periphery of a central opening, a transparent tubular member adapted for lateral insertion between said headpieces forming communication with the openings therein and with its opposite ends in abutting relationship with said annular shoulders, a resilient gasket circumscribing each end of said tubular member, a pair of annular members circumscribing said tubular member and adapted for movement relative to said headpieces, a portion of each of said annular members loosely circumscribing the annular shoulder on the respective headpiece, and a plurality of clamping members coacting between each annular member and the respective headpiece, said clamping members each provided with an over-center movement and adapted to produce a resilient clamping action between each annular member and the respective gasket at the junction of the tubular member and the headpiece and permitting quick removal and replacement of the tubular member with respect to said headpieces.

References Cited by the Examiner
UNITED STATES PATENTS

| | | | |
|---|---|---|---|
| 348,669 | 9/1886 | Gruber | 141—94 |
| 803,469 | 10/1905 | Cilley et al. | 222—155 |
| 1,429,303 | 9/1922 | Sumbling | 220—55 XR |
| 1,512,971 | 10/1924 | Zolleis | 222—155 |
| 1,728,965 | 9/1929 | Hein | 141—319 XR |
| 1,782,062 | 11/1930 | Erickson | 285—311 XR |

LAVERNE D. GEIGER, *Primary Examiner.*